Feb. 17, 1931. C. D. REED 1,793,374
METHOD OF AND MACHINE FOR MAKING PRETZELS
Filed June 28, 1928  5 Sheets-Sheet 4
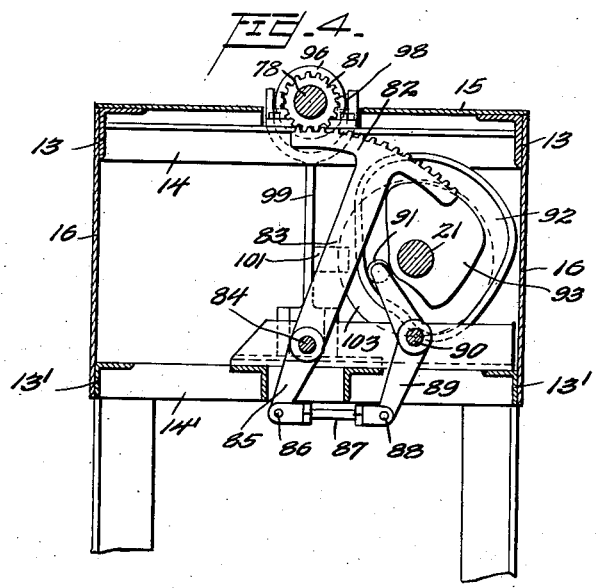
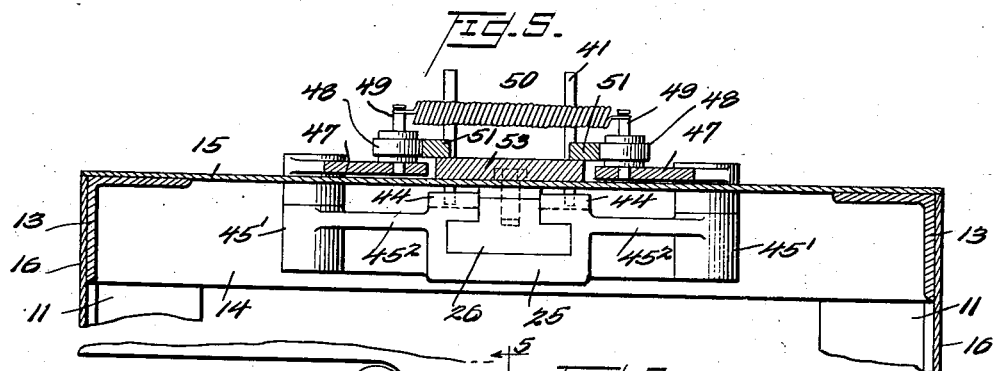
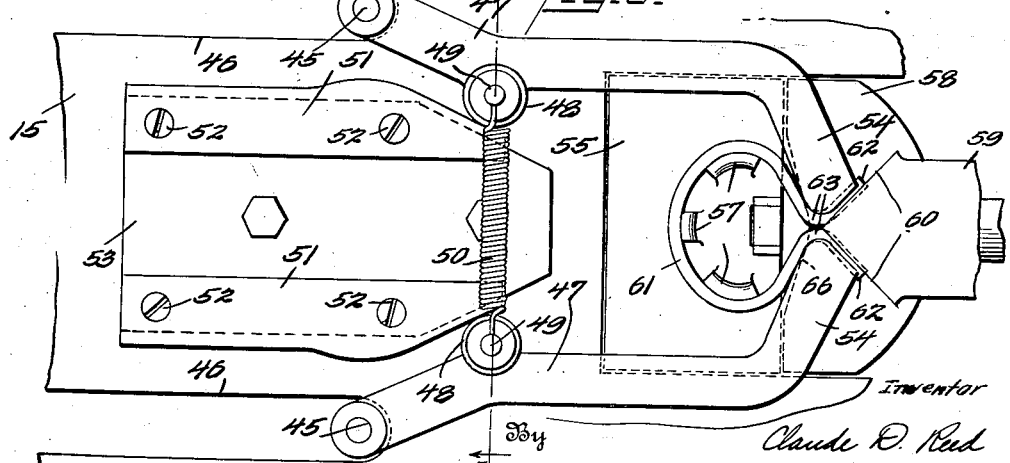

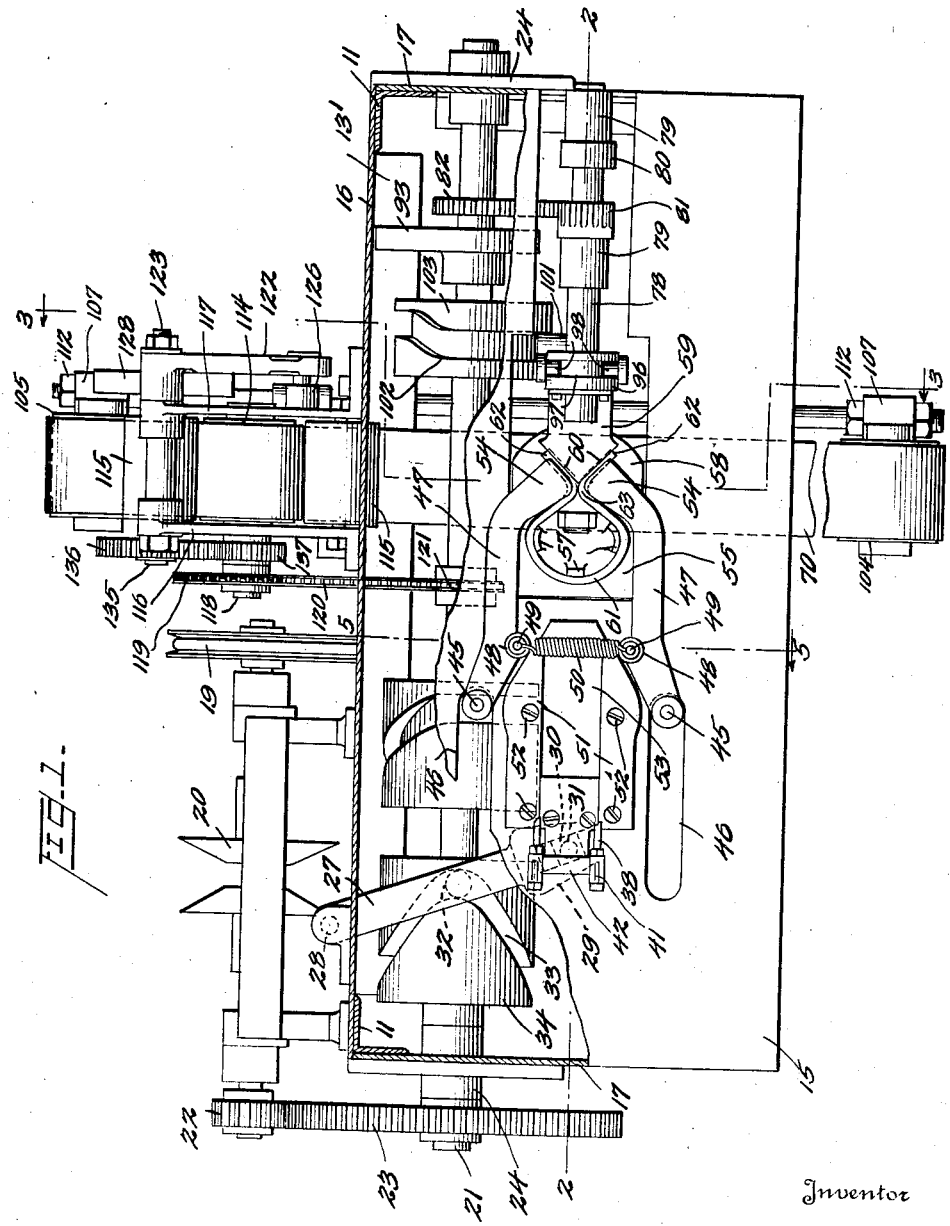

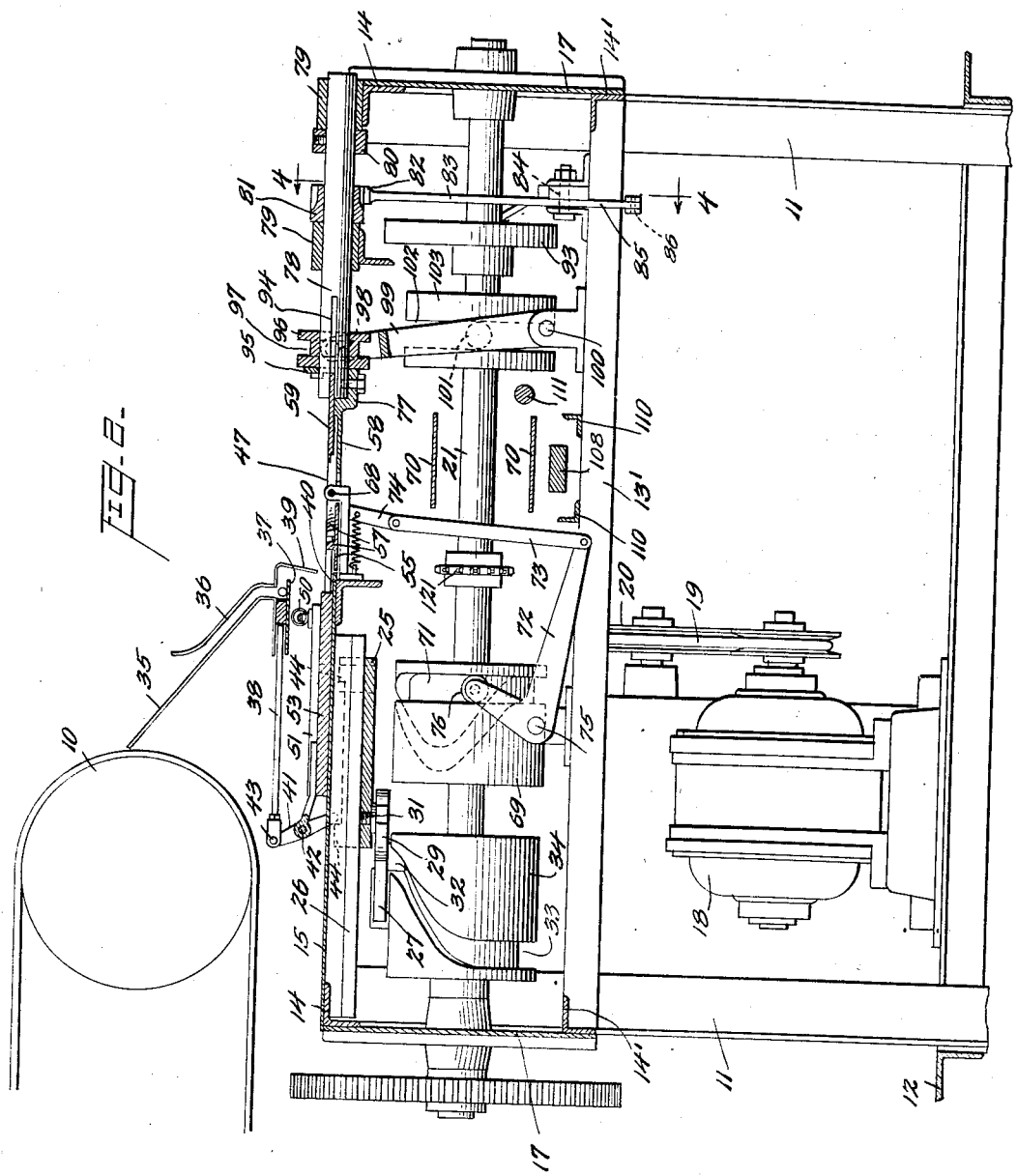

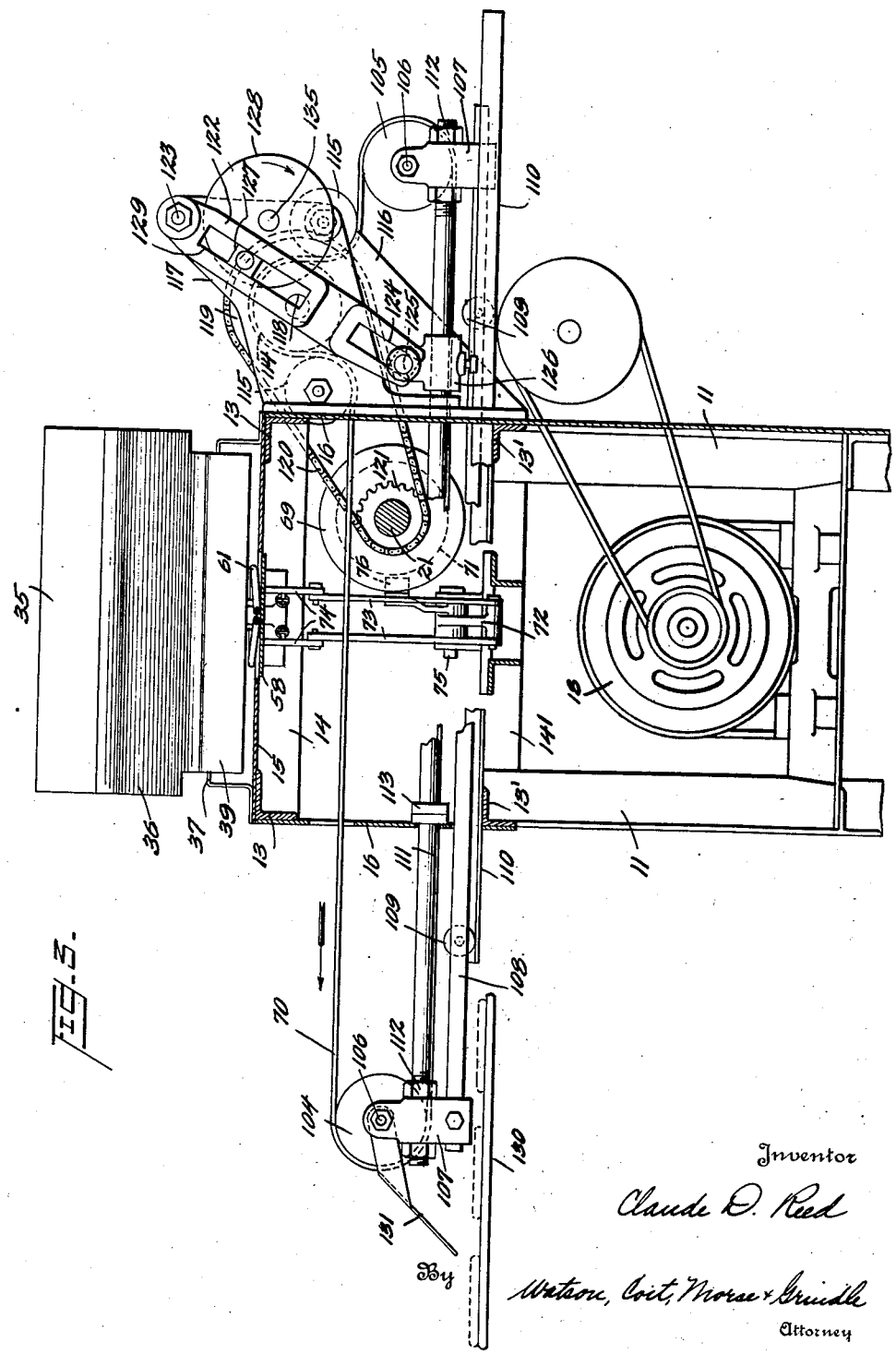

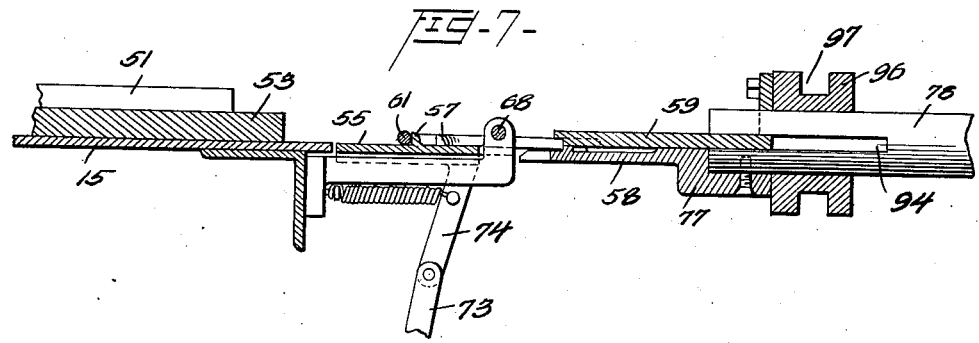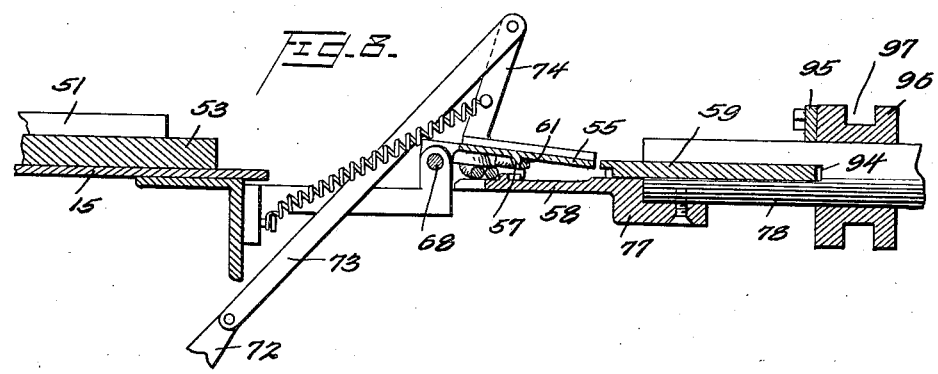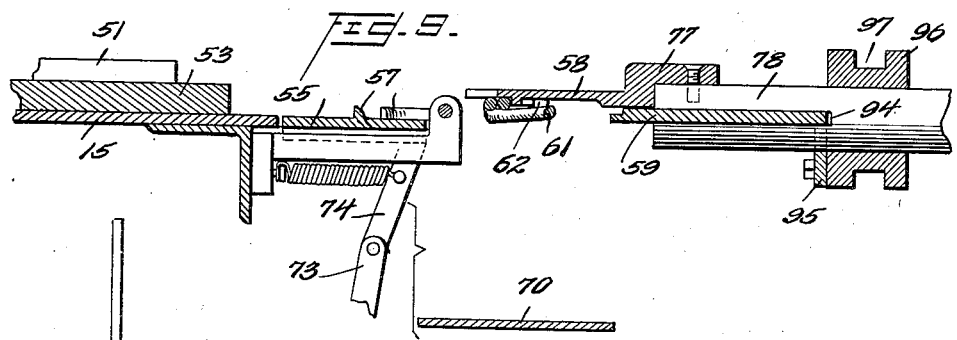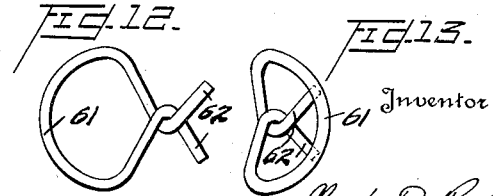

Patented Feb. 17, 1931

1,793,374

UNITED STATES PATENT OFFICE

CLAUDE D. REED, OF LEBANON, PENNSYLVANIA

METHOD OF AND MACHINE FOR MAKING PRETZELS

Application filed June 28, 1928. Serial No. 288,964.

This invention relates to a pretzel making machine and particularly to a machine for bending, twisting and folding a rod or blank of pretzel dough into a completed pretzel form ready to be dipped, salted and baked. The machine further includes a novel conveying mechanism for handling finished pretzel forms and removing them from the machine.

The main features of novelty of the invention may be enumerated as follows, and those of lesser import will be apparent to those skilled in the art after a consideration of the accompanying drawings and following specification:

1. The method of bending, twisting and folding a blank or rod of dough into the form of a pretzel without the use of clamps, clips or the like and without having any waste ends to be snipped after the blank is formed into a pretzel.

2. The arrangement of a compact machine for receiving the pretzel blank, feeding the same to a work table and thereafter performing the necessary operations to form the blank, and finally delivering the blank from the machine to a suitable receptacle.

3. The provision of a machine adapted for use with interchangeable forming arms, forming arm cams, folding plate and twister plate whereby various size pretzels may be formed on the same machine.

4. The use of a single main shaft containing cams for operating all of the elements necessary to change the rod or blank into a completed pretzel form.

5. The arrangement of a folding plate and a twister plate in juxtaposition, one adapted to fold about an axis transverse to the machine and the other to rotate about a longitudinal axis.

6. The use of a twister plate and a stripper plate in cooperation to form the diverging arms of a pretzel and to twist them.

7. The use of the twister plate to hold a completed pretzel form and to deliver the form while returning to its normal position.

8. The provision of a belt conveyor for completed forms adapted to deposit them in rows on a receiving board or belt.

Referring now to the drawings:

Figure 1 discloses in plan a pretzel machine constructed according to the present invention, a part of the bed plate or work table thereof being broken away to show the operating cams;

Figure 2 is a longitudinal vertical section on line 2—2 of Fig. 1;

Figure 3 is a transverse vertical section on broken line 3—3 of Fig. 1;

Figure 4 is a partial transverse vertical section on line 4—4 of Fig. 2;

Figure 5 is a partial transverse vertical section, on a larger scale, taken on line 5—5 of Figs. 1 and 6;

Figure 6 is an enlarged plan view of the former mechanism;

Figure 7 is an enlarged longitudinal vertical section on line 2—2 of Fig. 1, showing the folding plate in normal position;

Figure 8 is a view similar to Fig. 7, but showing the plate tilted to its extreme folding position;

Figure 9 is a view similar to Fig. 7, but showing the twister plate rotated through an angle of 180 degrees;

Figure 10 is a plan view of a blank from which a pretzel is folded; and

Figures 11, 12, and 13 show progressive steps in the formation of the finished pretzel form.

The machine of the present invention is intended for operation in connection with a dough rolling and feeding device, the delivery mechanism of which is shown in Fig. 2 at 10. Such machines are well-known and are usually referred to as rolling machines. They deliver definite lengths of dough periodically to the belt of the feeding mechanism which delivers them to the present machine, as will be later described.

The pretzel forming machine is preferably built upon a frame composed of welded or riveted structural forms and plates. It is supported on vertical angle bars 11 secured to the corners of a rectangular base 12. Suitable longitudinal and transverse members 13, 13', 14, and 14' connect these vertical corner pieces at the top and at a distance below the top and form the frame work to receive the heavy flat sheet 15 forming the work table, the side sheets 16 and the end sheets 17, which give the upper part of the machine the configuration of an inverted box. Within this box is housed substantially all of the operating mechanism.

The machine is adapted to be driven by any suitable source of power, such as, for instance, the electric motor 18 mounted on the base and driving through the belt 19, the change speed device 20 of any well-known form supported by the frame. This change speed device is adapted to be varied at will to regulate the speed of the main shaft 21 of the machine while the speed of the motor remains substantially constant. A pinion 22 on the drive end of the change speed mechanism is engaged with the gear 23 secured to the main shaft 21. This main drive shaft extends longitudinally of the machine about half way between the table and the members 13' and a little to one side of the transverse center. It is mounted in detachable bearings 24 secured to the end plates of the machine in such a manner that they can be removed and the whole shaft withdrawn without otherwise dismantling the machine. This shaft carries all of the cams and other drive mechanism for producing the operation of all of the cooperating parts through all of their necessary motions in the complete cycle of forming a pretzel. One revolution of this shaft occurs for each pretzel formed.

A crosshead 25 is mounted for longitudinal reciprocation on the non-circular guide rod 26 just below the work table 15, at the transverse center of the machine and at the drive gear end thereof. This crosshead is reciprocated by means of the lever 27 pivoted at 28 to a fulcrum block secured to the side plate 16 on the change speed side of the machine. The opposite end of the lever 27 is forked as at 29 and fits over a square sliding block 30 journaled on a pin 31 secured in the crosshead. A roller 32 journaled on a pin depending from the lever 27 engages in the slot 33 in the drum cam 34 mounted on the main drive shaft. As seen in Figs. 1 and 2, this cam slot 33 is arranged to move the lever 27 forward and backward in a half revolution of the cam and then to retain the lever in its retracted position through the other half revolution.

The rotation of the main shaft is adapted to be timed in synchronism with the feeding of blanks or strips of rolled dough from the mechanism 10. Such strips roll down the inclined chute 35 beneath the guard plate 36 and drop onto the shelf 37 as shown. Side guide members shown in Fig. 3 insure the proper lateral positioning of the blank. A pusher plate 38 operates along the surface of the shelf 37 and when projected forwardly pushes the blank off of the end of the shelf where it is guided by the lip 39 of the cover plate 36 onto the work table at 40. The pusher plate 38 is reciprocated through the agency of the lever 41 pivoted at 42 to a support on the work table and pivoted at 43 to a rod secured to the rear end of the pusher plate. The lower end of the lever 41 projects through a slot in the work table so that it can be engaged by the lugs 44, one on either end of the upper surface of the crosshead. When the crosshead is in the forward position as shown in Fig. 2, the rear lug engages the end of the lever 41 and retracts the pusher plate so that a blank can drop on the shelf 37. When the crosshead is retracted, the lug 44 on its front end engages the lower end of the lever 41 and projects the pusher plate forward to push the blank off of the shelf 37. Thus the pusher plate moves forwardly and rearwardly once for each rotation of the cam 34, but makes these motions with great rapidity at the ends of the stroke of the crosshead.

A pair of laterally spaced pins 45 project upwardly from bosses 45' on lateral extensions $45^2$ from the crosshead as shown in Fig. 5 and pass through the slots 46 in the work table. Pivoted to each of the pins 45 is a forming arm 47, best shown in Fig. 6. The two arms are similarly shaped but reversed in position. A short distance from their pivot points on the pins 45 each is provided on its upper surface with a roller 48 pivoted on the pin 49 mounted in the forming arm. The pins 49 project upwardly beyond the rollers and are provided with grooved ends for the reception of eyes on the ends of the retractile coil spring 50 which normally draws the forming arms toward each other. As the forming arms move longitudinally of the table with the motion of the crosshead, they are displaced from each other laterally by the action of the rollers 48 on the faces of the cam blocks 51 secured by the screws 52 to the mounting block 53 bolted onto the work table of the machine. In their most projected position the folding arms have their turned in inner ends 54 almost together, but in their retracted position these ends are widely separated and are drawn back beyond the position 40 at which the blank is dropped when pushed off of the shelf 37 by the pusher plate. The ends of the forming arms have semi-cylindrical channels therein of a diameter substantially equivalent to that of the blank. This way the bar is partially gripped when first engaged by the forming arms and is kept from lateral movement. It will be noted that the blank is dropped onto the work table when the crosshead, and hence the forming arms, is fully retracted.

Upon forward movement of the crosshead the tips of the folding arms which substantially slide along the surface of the work table, engage the ends of the blank and move the whole blank forward onto the folding plate 55 set in an opening in the work table with its upper surface flush with that of the work table. On this folding plate are the raised forming projections 57 against which the blank is carried by the tips of the forming arms while the rollers of the forming arms are on the substantially straight portions of their actuating cams. As the blank begins to bend about the foremost of the projections 57, the arms begin to converge to follow the end portions thereof so that the blank is looped around the projections as shown best in Fig. 6. The end portions of the blank are pressed forward onto the surface of the twister plate 58, which is of the same width as the folding plate and has its surface slightly below that of the work table, as best shown in Fig. 7. Mounted above the twister plate is the stripper plate 59 whose forward end has the converging edges 60 to divergently arrange the end portions of the blank which project beyond the loop formed about the projections 57, as shown in Fig. 6. The ends of the blank are pressed against the end of the stripper plate and a raised portion on the twister plate by means of the forwardly and convergingly moving forming arms until these arms reach the position shown in Fig. 6. Here the final converging action presses the junctions between the loop and the diverging end portions of the blank tightly together so that the dough of the two parts adheres. In Fig. 11 is shown the form which the blank has now assumed with the loop portion 61, the diverging end portions 62 and the junctions 63 stuck together. At the completion of this action the forming arms are opened and retracted, leaving the blank in the position just described.

With the exception of the projections 57 and the hinge bosses the upper surface of the folding plate is flat and flush with the work table, but the twister plate is cut away in the area not covered by the stripper plate so that it is slightly below the level of the work table. The edge of the twister plate abutting the folder plate is cut away as at 66 in a large radius arc for a purpose to be later described. Where the edges 60 of the stripper plate meet the twister plate, there is formed by proper shaping of these edges and of a raised part on the twister plate a substantially semicircular channel, which together with the semicircular grooves in the ends of the forming arms, when they are positioned as shown in Fig. 6, form cylindrical passages about the same diameter as the blank. At the end of their movement the forming arms press the blank into the channels formed between the twister plate and the stripper plate so that the end portions thereof are fairly tightly held in this position.

As soon as the forming arms have been retracted the twister plate and with it the stripper plate is rotated about a longitudinal axis through its transverse center throughout an angle of 360 degrees. The cut away part 66 allows that portion of the loop of the blank which projects over the edge of the folder plate to be free and clear of the edges so that the junctions 63 of the blank are twisted and the blank assumes the shape shown in Fig. 12 at the completion of this 360 degrees of rotation. The end portions of the blank are wedged into the mentioned grooves tightly enough to be held in place during this twisting operation.

Upon the completion of the twist the stripper plate is retracted, but does not move the blank, since the ends thereof bear against the lower wall of the groove formed by the twister and stripper plates. Thereupon the folder plate which is pivoted about a transverse axis 68 substantially at the junction between itself and the folder plate and slightly above the level of the work table, is rotated throughout an angle of slightly more than 180 degrees to the position shown in Fig. 8, thus carrying the loop back over the projecting end portions until its center section is set down exactly on the tips of these end portions and there squeezed until a union between the meeting parts is accomplished, whereupon the folding plate is retracted to its normal position, leaving on the twister plate a finished pretzel form such as shown in Fig. 13. The spaces between the center and the side projections 57 on the folding plate leave room for the diverging end portions of the pretzel so that they are not mashed when the plate is turned up over them.

With the stripper plate still retracted, the twister plate is returned 180 degrees of the 360 degrees of motion imparted to it, and momentarily stops in the inverted position shown in Fig. 9 with the pretzel form beneath it. The stripper plate is at this time projected to its normal position and then slightly beyond to strip the pretzel form loose from the folder plate in case it is stuck to the same. This allows the form to drop by gravity onto the conveyor belt 70 later to be described, which carries it away.

The folding plate is operated in timed relation to the movement of the other parts previously described, by means of the cylindrical cam 69 mounted on the main shaft 21 adjacent the cam 34 and having such a groove 71 in its surface as to cause the actuation of the folding plate in a short portion of the whole rotation of the drive shaft. Motion of the cam is transmitted to the folding plate by means of the bell crank lever 72, the links 73 and the arms 74 secured or formed integral with the folding plate and projecting downwardly from near the hinged end thereof and slightly rearward. The links 73 are pivoted at their ends to one end of the arms 74 and one end of the long arm of the bell crank lever. The apex of the bell crank lever is pivoted at 75 to a suitable fulcrum block secured to a transverse plate mounted on the longitudinal members 13'. On the side of the short arm of the bell crank lever is mounted the roller 76 closely fitting in the groove 71. The two extreme positions of the folding plate are shown respectively in Figs. 7 and 8.

The twister plate 58 is a casting having the depressed offset 77 arranged to be secured to the outer end of a longitudinal shaft 78 so that the highest level of the twister plate is at the axis of the shaft. This shaft 78 is supported in bearings 79 suitably mounted on the frame of the machine, and is prevented from longitudinal movement by means of the collar 80 and the pinion 81 which respectively bear against the inner faces of the bearings 79. Rotation is imparted to the shaft 78 by means of a gear segment 82 which meshes with the pinion 81 thereon. This segment is mounted at the end of a lever 83 pivoted at 84 in a bracket secured to the frame of the machine. The lever 83 has an extension 85 projecting below the pivot and its outer end is pivoted at 86 to an adjustable link 87 the opposite end of which is pivoted at 88 to a bell crank lever 89, the apex of which is fulcrumed at 90 to a bracket secured to the machine frame. The opposite arm of the bell crank lever is provided with a roller 91 actuated by the walls of the groove 92 in the radial face of the cam 93 secured to the main drive shaft. This cam has the configuration shown in Fig. 4 so that there is a portion of the groove concentric to the shaft to hold the twister plate stationary during the initial forming of the pretzel before the twisting. A portion of the cam is shaped to provide the 360 degree rotation of the shaft 78. There is another concentric portion which holds the twister plate stationary during the folding operation. A portion of the cam then produces the 180 degree back rotation of the shaft 78, a short concentric portion holds the twister plate stationary while the formed pretzel is dropped with the assistance of the stripper plate if required, and then a portion of the cam groove returns the twister plate to its initial position, where it is held by the main concentric portion of the cam.

The stripper plate is mounted for longitudinal reciprocation in the longitudinal slot 94 in the end of the shaft 78 so positioned that the stripper plate can overlie the upper face of the twister plate. As best seen in Fig. 1, the stripper plate is much wider than the shaft and the rear end of this plate is turned up as at 95 and is provided with a semi-circular cut-out portion to slide over the upper half of the shaft above the slot. This bent up portion is secured rigidly to the face of a collar 96 having a sliding fit on the shaft and provided with a circumferential groove 97 in which fit the trunnions 98 seen in Fig. 1 carried at the end of the lever 99 pivoted at 100 to a suitable bracket carried by the machine frame. At 101 is a roller journaled on a pin on the lever 99 and engaging in the groove 102 in the circumference of the drum cam 103. The action of this groove is to move the lever and with it the collar and stripper plate as explained in the early part of this specification.

As previously stated, the pretzels are dropped onto the delivery belt 70 which travels transversely of the machine and is given a reciprocating motion in order that the pretzels may be distributed over the surface of a board or other similar carrying device on which they may be transported to receive subsequent operations. It is preferred that they be delivered to a board which extends parallel to the length of the machine and which is moved in steps either mechanically or manually to allow transverse rows of pretzel forms to be arranged thereon by the conveyor mechanism now about to be described.

The belt 70 is supported at its ends by the head and tail pulleys 104 and 105 which are journaled on spreader pins 106 which secure together the two halves of the conveyor bracket bearings 107 which are carried at opposite ends and rigidly secured to the guide bar 108 having mounted thereon a series of rollers 109 adapted to run in the guide angles 110 which permit the whole conveyor belt mechanism to be reciprocated transversely of the machine. The guide angles are secured to the longitudinal frame members 13'. The tension of the belt can be adjusted by extending or contracting the space between the head and tail pulleys by means of the tie rod 111 which passes through the bearing brackets and is secured thereto by means of the nuts 112. This tie rod operates in guide bearings 113 in the side plates 16 of the machine. The lower reach of the belt 70 extends directly between the head and tail pulleys while the upper reach passes over the drive pulley 114 and under the guide pulleys 115 which give the belt at least 180 degrees of contact with the drive pulley. The shafts for the guide pulleys and drive pulley are mounted between the conveyor drive mechanism frames 116 and 117 which are securely bolted to the side 16 of the machine and are spaced apart by suitable spacers. The drive pulley is rigidly secured to the shaft 118 carrying the sprocket 119 driven by the roller chain 120 from the sprocket 121 on the main shaft 21 of the machine. It will be seen that rotation of the drive pulley will cause the belt to travel continuously in the direction of the arrow in Fig. 3.

The conveyor belt frame is caused to reciprocate in the guides by a lever 122 pivoted at 123 to the frame 117 and having the forked lower end 124 fitting over a box 125 journaled upon the clamp 126 which is adjustably and rigidly secured to the tie rod 111. A square box 127 pivoted to the face of the crank disk 128 moves in the slot 129 in the lever 122 and causes it to oscillate and thus reciprocate the conveyor mechanism. The crank disk is on one end of the shaft 135, the other end of which carries the gear 136 meshing with the pinion 137 on the shaft 118 which is driven by the chain. The drive is such that the crank disk rotates clockwise as viewed in Fig. 3, and causes a slow movement to the left of the conveyor mechanism and a quick return to the right in accordance with the well-known principle of the mechanism just described. This movement of the conveyor mechanism has no effect on the continuous drive of the belt by means of the drive pulley 114.

The formed pretzels as they are discharged from the twister plate fall onto the belt 70 in regular order, one for each cycle of the machine. The conveyor belt travels forward a certain distance before the next shape is deposited thereon, and so on. As the belt travels to the left as viewed in Fig. 3, it eventually discharges a pretzel form as shown in dotted lines at the left hand edge of the receiving board 130. The rapid return of the conveyor mechanism causes the head pulley 104 to run under the belt, allowing the second form to drop at the center of the board as shown in dotted lines, and a further return movement of the conveyor allows the third form to drop at the right hand edge of the board. Obviously any number of forms can be arranged to be deposited across the width of the board in accordance with the ratio of the speed of the belt and the speed of the conveyor mechanism. The slow return movement of the conveyor assembly to the left, while somewhat slower than the speed that the belt travels, yet gives the operator time to move the board 130 forward to receive a second row of forms adjacent that already deposited.

The guide plate 131 carried by the bracket members 107 assists in loosening the form from the conveyor belt and guides it easily to the board 130.

The machine is adapted to form various size pretzels by the mere substitution of the proper sized and shaped forming arms, forming arm cams, folder plate, twister plate and stripper plate. These parts can be quickly interchanged so that the machine is of universal use.

It will be understood that while the invention as described has been disclosed in a specific embodiment, nevertheless various changes may be made in the operative mechanism, the arrangement and the lay out of the parts without departing from the spirit of the invention as expressed in the appended claims.

Having thus described the invention, what is claimed as new and desired to be secured by Letters Patent is:

1. The method of making a pretzel consisting in bending a straight strip of dough into a loop and diverging end portions while retaining it in a plane, squeezing together the junctions of the loop and end portions to cause them to adhere to each other, rotating the end portions about the bisector of their included angle to twist said junctions together and bending said loop back over said end portions.

2. The method of making a pretzel consisting in bending a straight strip of dough into a loop and diverging end portions, squeezing together the junctions of the loop and end portions to cause them to adhere to each other, rotating the end portions while fully supported throughout their length about the bisector of their included angle to twist said junctions together, bending said loop back over said end portions and pressing the loop onto the ends of said portions to cause it to adhere thereto.

3. The method of making a pretzel consisting in bending a straight strip of dough into a loop and diverging end portions while retaining it in a plane, rotating the end portions about the bisector of their included angle and bending the loop back over the said end portions.

4. In a pretzel machine, in combination, means to support a strip of dough throughout its full length, means to bend the strip while supported into a closed loop with diverging end portions, means to rotate the end portions about the bisector of their included angle and means to fold said loop back over said end portions.

5. In a pretzel machine, in combination, a bed plate, means to move a pretzel blank along said plate and form a closed loop in the same, a twister plate adapted to receive and support the diverging ends of said blank extending from said loop and means to rotate said twister plate to twist said blank.

6. In a pretzel machine, in combination, a bed plate, a folder plate set therein, a twister plate adjacent said folder plate and means to move a blank along said bed plate and bend the same to rest on both the folder and twister plates, said means forming said blank narrowest at the junction of said plates.

7. In a pretzel machine, in combination, a bed plate, a folder plate flush therewith, means to move a blank from said bed plate to said folder plate, said means and said folder plate being adapted to cooperate with said blank to form the same into a closed loop on said folder plate with end portions extending beyond the edge of said folder plate.

8. In a pretzel machine, in combination, a bed plate, a folder plate flush therewith, means to move a blank from said bed plate to said folder plate, said means and said folder plate being adapted to cooperate with said blank to form the same into a loop on said folder plate with end portions extending beyond the edge of said folder plate, means to twist said ends and means to turn said folder plate and loop over onto said ends.

9. In a pretzel machine, in combination, a bed plate, a folder plate set in said bed plate, a twister plate adjacent said folder plate, forming arms, means to move said arms longitudinally over said plates in the order named, and means to move said arms in relation to each other.

10. In a pretzel machine, in combination, a bed plate, a folder plate set in said bed plate, forming projections on said folder plate, a twister plate adjacent said folder plate, a former on said twister plate, and forming arms adapted to move over said three plates in the order named.

11. In a pretzel machine, in combination, a bed plate, a folder plate set in said bed plate, forming projections on said folder plate, a twister plate adjacent said folder plate, a former on said twister plate, forming arms, means to move said arms longitudinally over said plates in the order named, and means on said arms to cooperate with said forming projections and former to shape a pretzel blank.

12. In a pretzel machine, in combination, a bed plate, a folder plate set in said bed plate, forming projections on said folder plate, a twister plate adjacent said folder plate, a stripper plate movable over said twister plate, and forming arms adapted to move over said first three plates in the order named.

13. In a pretzel machine, in combination, a bed plate, a folder plate set in said bed plate and adapted to be rotated substantially about one of its edges, and a twister plate abutting said edge of said folder plate and adapted to be rotated about an axis at right angles to said edge.

14. In a pretzel machine, in combination, a bed plate, a folder plate set in said bed plate and adapted to be rotated substantially about one of its edges, a twister plate abutting said edge of said folder plate and adapted to be rotated about an axis at right angles to said edge, means to move and form a blank with a loop on said folder plate and diverging end portions on said twister plate, means to then rotate said twister plate 360°, and means to then rotate said folder plate to fold said loop onto said twister plate.

15 In a pretzel machine, in combination, a bed plate, a folder plate set in said bed plate and adapted to be rotated substantially about one of its edges, a twister plate abutting said edge of said folder plate and adapted to be rotated about an axis at right angles to said edge, means to move and form a blank with a loop on said folder plate and diverging end portions on said twister plate, means to then rotate said twister plate 360°, means to then rotate said folder plate to fold said loop onto said twister plate, and means to then rotate said twister plate 180° to drop the formed blank.

16. A twister mechanism for pretzel machines including in combination, a shaft, a plate extending from the end of said shaft, an elevated portion on said plate and a stripper carried by said shaft and movable to cooperate with said elevated portion to form a channel to receive a portion of a pretzel blank.

17. A twister mechanism for pretzel machines including in combination, a shaft, a plate extending from the end of said shaft, an elevated portion on said plate and a stripper carried by said shaft and movable to cooperate with said elevated portion to form a channel to receive a portion of a pretzel blank, means to rotate said shaft and means to move said stripper along said plate axially of said shaft.

18. In a pretzel machine, in combination, a bed plate, a folder plate set in said bed plate and adapted to be rotated substantially about one of its edges, a twister plate abutting said edge of said folder plate and adapted to be rotated about an axis at right angles to said edge, means to move and form a blank with a loop on said folder plate and diverging end portions on said twister plate, means to then rotate said twister plate 360°, means to then rotate said folder plate to fold said loop onto said twister plate, means to then rotate said twister plate 180° to drop the formed blank, and means to release said blank from said twister plate.

19. In a pretzel forming machine, in combination, a substantially flat bed plate, means to feed a blank thereon, a folder plate set in said bed plate, forming projections on said folder plate, a twister plate abutting said folder plate, a stripper cooperating with said twister plate, means to move said blank and form the same about said projections and against said stripper, means to rotate said twister plate and stripper to twist said blank, means to withdraw said stripper, means to rotate said folder plate to fold the portion of the blank thereon over that portion on the folder plate, means to again rotate said twister plate and means to project said stripper to release said formed blank from said twister plate.

20. In a pretzel forming machine, in combination, a substantially flat bed plate, means to feed a blank thereon, a folder plate set in said bed plate, forming projections on said folder plate, a twister plate abutting said folder plate, a stripper cooperating with said twister plate, means to move said blank and form the same about said projections and against said stripper, means to rotate said twister plate and stripper to twist said blank, means to withdraw said stripper, means to rotate said folder plate to fold the portion of the blank thereon over that portion on the folder plate, means to again rotate said twister plate and means to project said stripper to release said formed blank from said twister plate, the mechanism for operating all of said parts being beneath said bed plate.

In testimony whereof I hereunto affix my signature.

CLAUDE D. REED.